United States Patent Office.

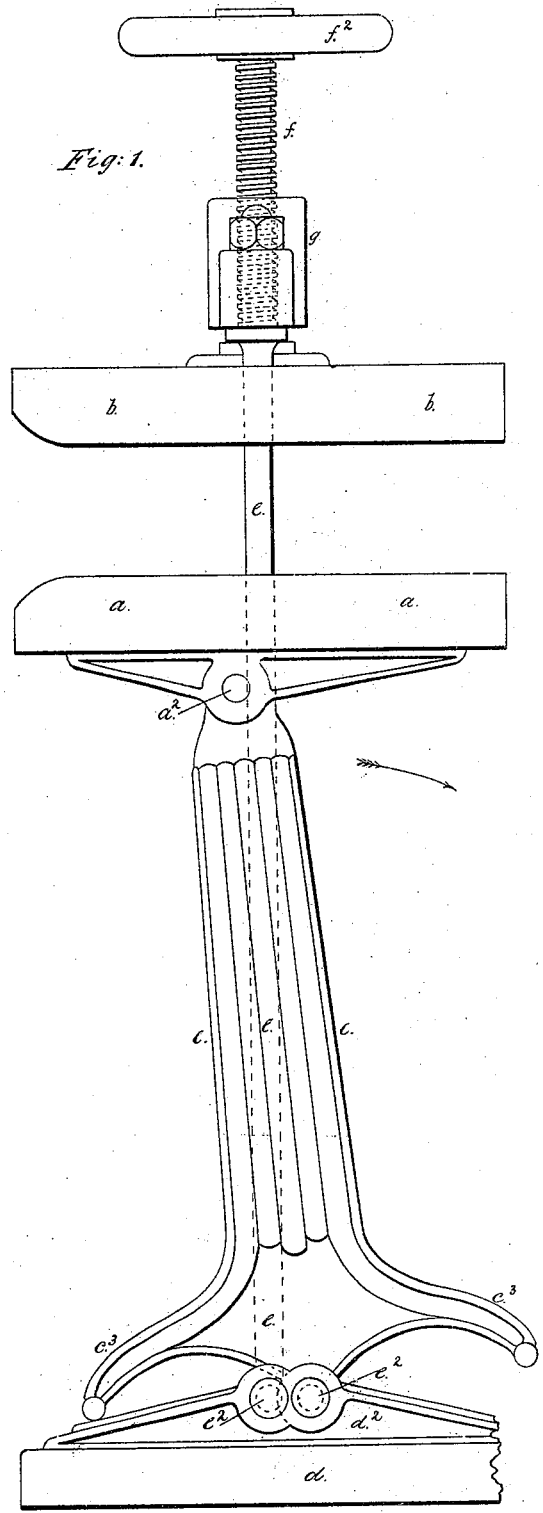

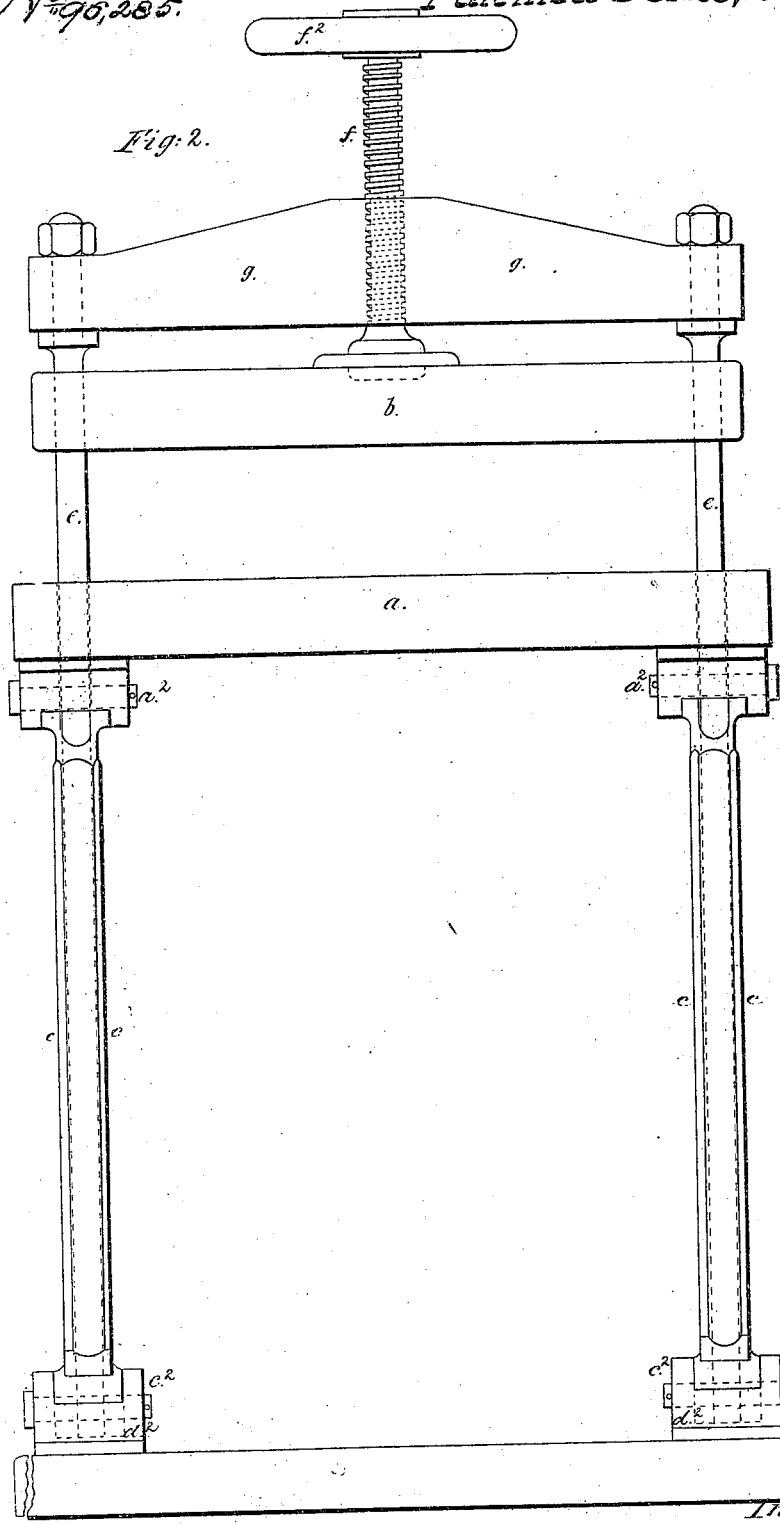

GEORGE TANGYE, OF BIRMINGHAM, ENGLAND.

Letters Patent No. 96,235, dated October 26, 1869.

IMPROVEMENT IN COPYING-PRESSES.

The Schedule referred to in these Letters Patent and making part of the same.

To all to whom it may concern:

Be it known that I, GEORGE TANGYE, of the firm of Tangye Brothers, of Birmingham, in the county of Warwick, England, manufacturers, a subject of the Queen of Great Britain, have invented or discovered new and useful Improvements in Letter-Copying Presses; and I, the said GEORGE TANGYE, do hereby declare the nature of the said invention, and in what manner the same is to be performed, to be particularly described and ascertained in and by the following statement thereof; that is to say—

My invention consists in constructing and arranging the parts of letter-copying presses in the following manner:

The lower platen, or surface on which the copying book is placed while a letter is being copied, is supported on two hollow uprights, fixed to the base-plate of the press, the said uprights being connected to the said base by joints, which permit the said uprights and platen to have motion through a small angle in a vertical plane.

The said lower platen is connected to the top of the said uprights by joints.

The upper platen is supported by a screw, working in a cross-head, the said cross-head being fixed to the tops of two upright rods, passing through the hollow uprights carrying the lower platen.

The said rods are jointed to the base-plate of the press, the axes of the said joints being parallel to and a short distance from the axes of the joints supporting the lower platen.

When the platens are turned on their joints, by taking hold of the hollow uprights, the said platens are made to approach to or recede from one another, in consequence of the want of coincidence of the axes of their joints.

In using the press, the copying-book and letter to be copied, prepared in the usual way, are placed upon the lower platen, the upper platen having been previously adjusted to the thickness of the copying-book, by means of a hand-wheel attached to the screw.

By now pushing or pulling forward the platens, by means of the hollow uprights, the said platens are made to approach each other, and compress the copying-book between them with great force, and thereby copy the letter.

By loosing the uprights, the platens return to their normal positions, and the copying-book can be removed from the press.

Having explained the nature of my invention, I will proceed to describe, with reference to the accompanying drawing, the manner in which the same is to be performed.

Figure 1 represents in end elevation, and

Figure 2, in side elevation, a letter-copying press, constructed according to my invention.

The same letters of reference indicate the same parts in both figures.

$a$ is the lower platen or surface, and $b$, the upper platen or surface, between which the copying-book and letter are compressed.

The lower platen $a$ is supported on the hollow uprights $c\ c$, jointed at $c^2\ c^2$, to the base-plate $d$ of the press, the said uprights having motion through a small angle on their joints.

The axes of the joints $c^2$ are supported in the bearing-plates $d^2$.

On the bottom of each hollow upright $c$ are arms $c^3\ c^3$, for limiting the motion of the said uprights, the said arms, as the uprights are moved in one or other direction, coming against one or other side of the bearing-plates $d^2$ fixed to the base-plate $d$, as seen in fig. 1.

The said lower platen $a$ is jointed at $a^2$ to the uprights $c\ c$, for the purpose of enabling the said platen to preserve its parallelism to the upper platen $b$.

The upper platen $b$ is supported by the upright rods $e\ e$, which pass through the hollow uprights $c\ c$, in the manner indicated in dotted lines, and are jointed at $e^2$ to the base-plate $d$, as best seen in fig. 1.

The joints $e^2$ of the rods $e\ e$ are situated parallel to and a short distance from the joints $c^2$ of the hollow uprights $c\ c$.

The upper platen $b$ is not connected directly to the upper ends of the rods $e$, but through the screw $f$, working in the cross-head $g$ fixed to the said rods $e$.

By turning the screw $f$, by its hand-wheel $f^2$, the upper platen $b$ may be adjusted the required distance from the lower platen $a$.

By the positions of the joints $c^2\ c^2$ of the platens $a\ b$, it will be seen, that as the uprights $c$ and rods $e$ of the said platens are turned on their joints in one direction, the said platens will approach to one another, and, when turned on their joints in the other direction, will recede from one another.

The parts of the press are so balanced, that the normal position of the press is that represented in fig. 1.

In order to copy a letter by the use of this press, the upper platen $b$ is first adjusted, by its screw $f$, to the thickness of the copying-book used, and the said copying-book, and the letter to be copied, prepared in the usual manner, are placed on the lower platen $a$. By now taking hold of the hollow uprights $c$, and pushing or pulling them forward in the direction indicated by the arrow in fig. 1, the said upright $c$ and the rods $e$ turn on their respective joints, and the two platens $a\ b$ approach each other, and compress th copying-book between them with great force, and thereby copy the letter. On loosing the uprights $c\ c$, the parts of the press return to the positions represented in the drawing, and the copying-book can be removed from the press.

Having now described the nature of my invention, and the manner in which the same is to be performed, I wish it to be understood that I do not limit myself to the precise details herein described and illustrated, as the same may be varied without departing from the nature of my invention.

What I claim as my invention and improvements in letter-copying presses, is—

The combination of the hollow uprights $c\ c$ and rods $e\ e$, for carrying the lower and upper platens or surfaces, respectively, of the press, the said uprights and rods being so jointed to the base-plate of the press, that on turning them on their joints, the said platens are made to approach to or recede from one another, substantially in the manner, and for the purpose shown and described.

GEORGE TANGYE.

Witnesses:
RICHARD SKERRETT,
　7 *Cannon Street, Birmingham.*
HENRY SKERRETT,
　7 *Cannon Street, Birmingham.*